INVENTOR.
JEAN RUET

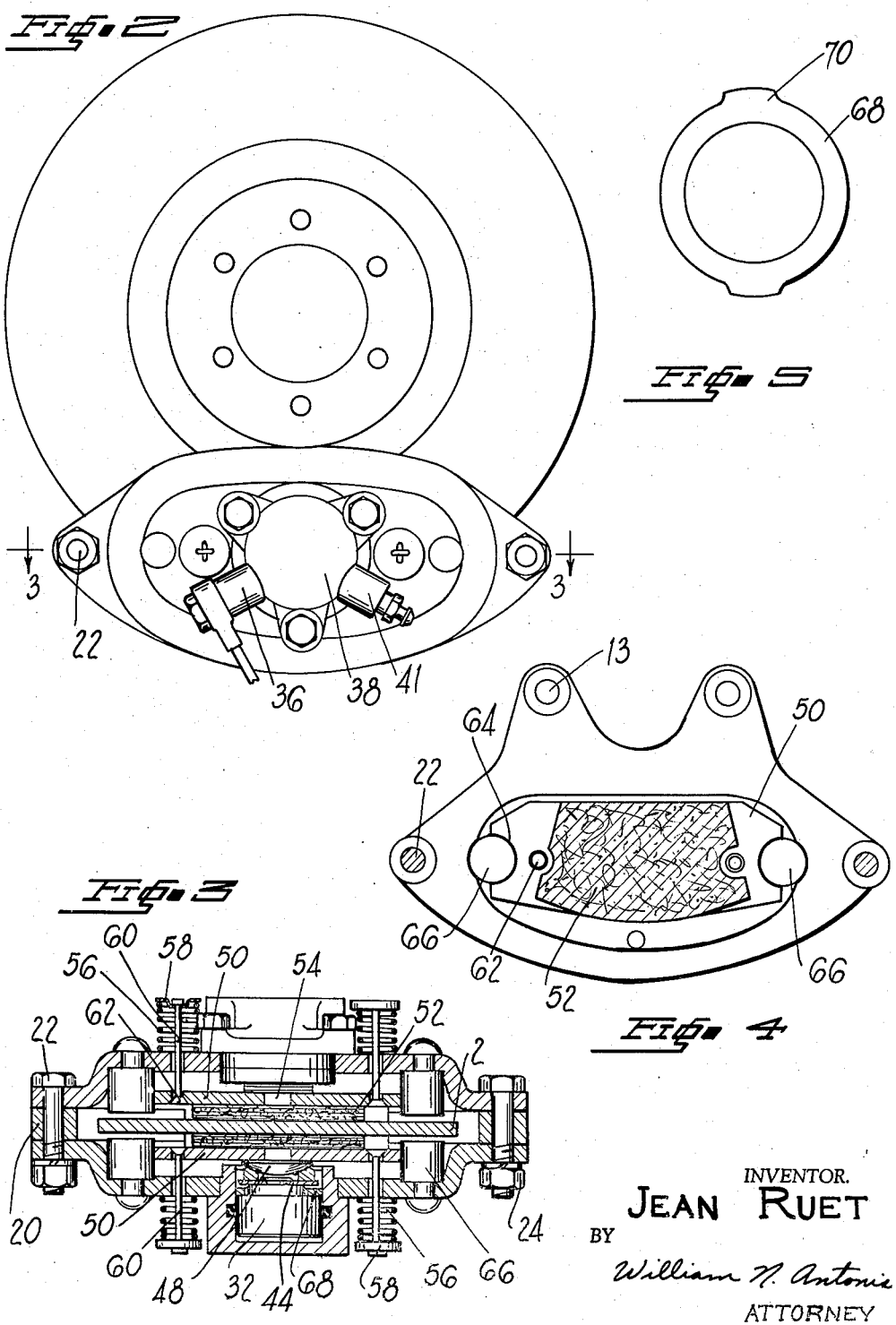

United States Patent Office 2,968,370
Patented Jan. 17, 1961

2,968,370

DISK BRAKES

Jean Ruet, Limeil Brevannes, France, assignor to The Bendix Corporation, a corporation of Delaware Filed Aug. 10, 1956, Ser. No. 603,303

9 Claims. (Cl. 188—73)

The invention relates to disk brakes of the type in which the fixed housing covers only a small portion of the rotating disk in order to enable a rapid evacuation of the heat generated during braking.

One object of the invention is to improve the construction of this type of brake and to provide better performance thereof.

Another object of the invention is to provide a disk brake in which the fixed housing is formed from two stampings secured together beyond the outer periphery of the rotating disk.

Another object of the invention is to provide a disk brake design which provides a proper seating and enables a proper pivoting of the wear pad.

Another object of the invention is to provide a brake in which the wear pads are loaded by a pair of springs located at the opposite ends of the respective wear pads to resist a tilting of said wear pad under the action of vibrations due to the vehicle motion. This design maintains the wear pads during their displacement parallel to the rotating disk.

A further object of the invention is to provide a brake in which a unit comprising the wear pad, the ball joint member and the complementary spherical seat is arranged floatingly with respect to the piston, and can thus slide laterally within a predetermined limit with respect to the latter.

Another object of the invention is to provide an automatic adjusting means for a disk brake of the type previously described.

Other objects and advantages of the invention will be apparent from a detailed description of the invention and from the appended drawings and claims.

In the drawings:

Figure 2 is a view of said disk brake looking in the direction of arrow "F" of Figure 1 with the wheel not shown;

Figure 3 is a sectional view taken according to line 3—3 of Figure 2;

Figure 4 shows details of the wear pad construction; and

Figure 5 is a view at a larger scale of the yielding member forming part of the automatic adjusting means intended to maintain a constant clearance between the wear pad and the rotating disk.

Figure 1:
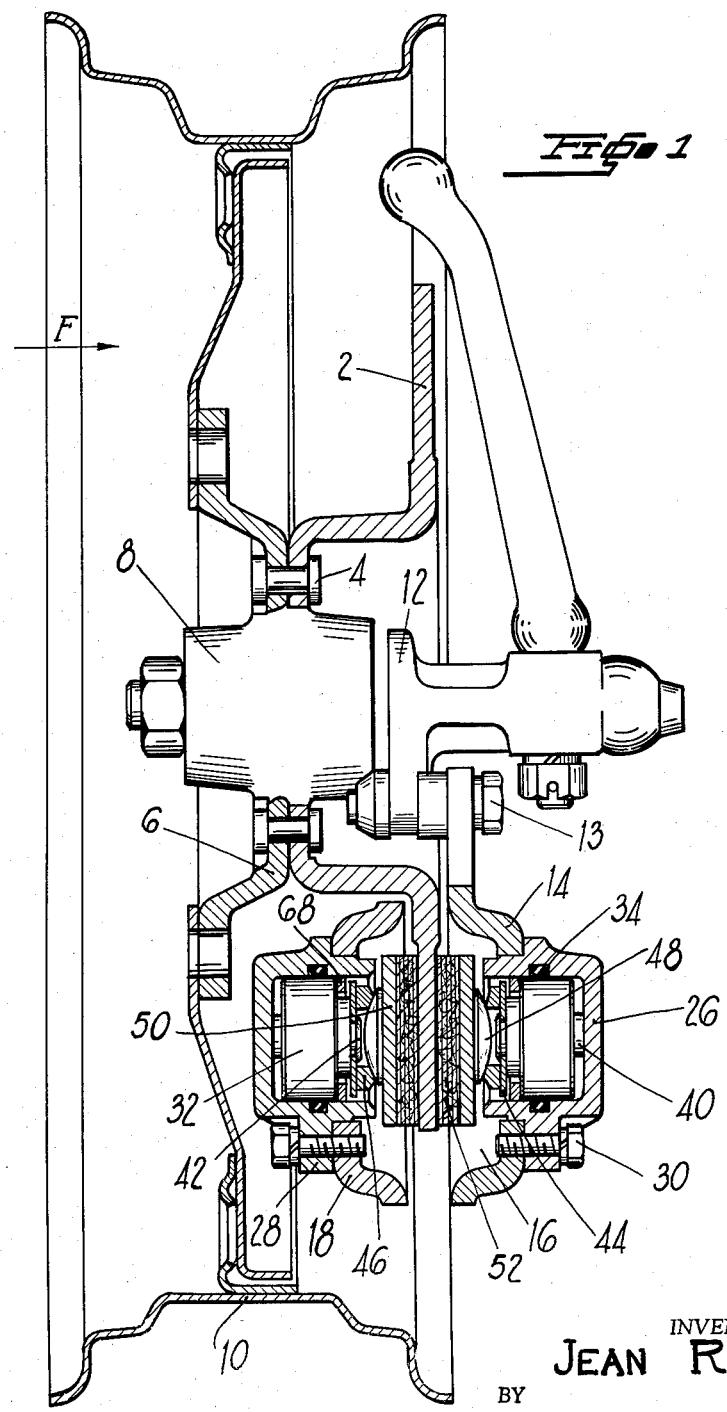
Figure 1 is a horizontal section of a disk brake embodying the invention.

In the embodiment illustrated in the drawings, the brake comprises an annular disk 2 secured by means of bolts and nuts 4 to a flange 6 formed on the rotating hub 8 of a wheel 10.

On the fixed housing 12 of the axle is secured by means of bolts 13 a stamped dish-shaped plate member 14 providing an elongated recess 16. The stamped dish-shaped plate member 14 cooperates with a complementary stamped dish-shaped member 18 through the intermediary of spacer member 20 (Figure 3), bolts 22 and nuts 24 to form the fixed housing within which is located the applying means. The latter comprises a pair of cylinders 26 formed with shoulders 28 seating on the outer surface of the respective plate member and fixed to the latter by means of screws 30. The cylinders 26 are each equipped with a piston 32 provided with O-ring 34 located in an annular groove formed on the inner surface of the cylinder and which is kept in frictional engagement with the external cylindrical surface of the piston.

These cylinders are provided with an inlet 36 (Figure 2) which communicates with the working chamber 38 against the end wall of which the piston 32 takes support through the intermediary of a projection 40 (Figure 1), thus forming in normal position said chamber at the rear of the piston. The cylinders are also provided with a outlet 41 which is normally closed by a conventional bleeding screw. The piston is formed with a reduced diameter extension forming a stud 42 on which is secured a flat member such as a flat washer 44. On this washer 44 is adapted to slide a member formed by a ring 46 in which is formed a spherical seat wherein is arranged a ball member 48 connected to wear pad 50 located in the corresponding recess 16; each wear pad is lined with a friction lining 52 preferably cured thereto. The radius of curvature of the ball member 48 is established in such a manner that the outer diameter thereof is substantially of the same size as the diameter of the piston, thus generating a friction torque, substantially larger than the torque which can be generated under the effect of vibrations occurring during the drive of the vehicle, but insufficient to preclude the pivoting of the wear pad under the action of the applying force. In the embodiment shown in Figure 1, ball member 48 has an outer diameter which is only slightly smaller than that of the piston 32. A reduced diameter extension 54 (Figure 3) integrally made with the ball member 48 is inserted in the wear pad.

It is to be noted that the arrangement of the ball members enables an application of the friction lining on the entire surface thereof, in spite of the unequal wear to which may be subject the friction lining, namely due to the difference of linear velocities of the elements of the rotating disk in accordance with the distance of said elements from the disk axis. Indeed, the setting under pressure of cylinders 26 results in displacement towards the rotating disk 2 of the piston 32 as well as of the wear pads connected thereto through the intermediary of ball members 48, and brings the friction lining 52 into engagement with the opposite faces of said rotating disk.

If at the moment when the respective wear pad 50 comes into contact with the rotating disk 2, its surface is not parallel to that of the disk, the applying force is sufficient to cause a pivoting of said wear pad on its ball member 48 and thus enable an application of the friction lining on the whole surface thereof.

As shown in Figure 4, the wear pad has an elongated shape enabling an adjustment of the position of the lining on said pad to compensate for the difference of linear velocities and eventually the tilting torque exerted on the friction lining in accordance with the construction described in copending application No. 609,222, filed September 11, 1956.

Each wear pad is urged to normal position, i.e. out of contact from the rotating disk, by a pair of springs 56 located near the respective ends of the wear pad and which take support at one end thereof on the outer surface of the respective plate member 14, 18, while the opposite end of said springs carry a washer 58 to which is connected a pin 60, extending through an aligned opening formed in the plate member and wear pad, and which is formed with a head 62 seated in a recess formed in the respective wear pad. The springs 56 exert on the surface of the ball member 48 a friction force larger than the forces due to vibration occurring during the drive of the vehicle, and the friction thus realizes a guiding effect which insures a displacement of the pads parallel to themselves.

It results therefrom that the wear pads return to normal position while remaining parallel to the plane of the disk and that even a slight return movement of the wear pad will interrupt the engagement on the whole surface of the pad.

This construction enables the adjustment of the piston stroke to a very small value and thus obtain the engagement of the friction lining for a very small pedal stroke.

The opposite ends of the wear pads can be provided with circular notches 64 which engage with anchor pins 66 located, or not, along a common axis and which act as stops arresting the movement of the wear pads 50 when the latter are carried in operation by the rotating disk. This floating movement is realized by a displacement with respect to the piston of the unit comprising wear pad 50, ball member 48, ring 46, so that the piston and the cylinder are not subject to any stress due to the displacement of the wear pads carried by the rotating disk.

Each piston 32 forms in association with the flat washer 44 (Figure 1) a recess in which is located a yielding member 68 arranged in frictional engagement with the wall of the cylinder to generate a force sufficient to overcome the return force of the springs 56. As shown in Figures 3 and 5, the yielding member 68 is arranged coaxially with the cylinder and is formed by a steel washer having two diametrically opposite projections 70 kept in frictional engagement with the surface of the cylinder. The outer diameter of these projections is slightly larger than that of the cylinder which results in distortion of said yielding member 68. This distortion and the elasticity of the member 68 generate on the periphery of each projection 70 forces of pressure higher than the return force exerted by the springs 56. The conventional machining processes enable to realize a sufficiently precise distortion of the yielding member to avoid a substantial variation of the forces of pressure exerted on the projections 70. The yielding member 68 is spaced from the flat washer 44 by a clearance "j" (Figure 1) the value of which corresponds to the amplitude of the clearance which is to be maintained between the friction lining 52 and the respective faces of the rotating disk 2. The yielding member 68 acts as an automatic adjusting device, the particulars of operation of which will be apparent from the description of operation given hereunder.

When fluid under pressure is sent into the twin cylinders 26, the pistons 32 are submitted to the action of an applying force which is larger than the friction resistance of the yielding member 68 and the tension of the return springs 56. The pistons are thus moved towards the disk and carry therewith the yielding member 68. Through the intermediary of the ring 46 and of the ball member 48 the said pistons bring into engagement with the rotating disk 2 the wear pad and the friction lining secured to the latter. The unit formed by the ring 46—ball member 48—wear pad 50 and friction lining 52 is enabled to slide on the flat washer 44 until the wear pads come into engagement with their respective anchor pins 66. It results from the foregoing that the braking torque is absorbed not by the piston but directly by the housing and the fixed support of the brake.

When the brake is released, the pressure drops in the cylinders 26. Under the action of the return springs 56, the unit comprising the wear pad and the piston effects a return movement for a distance equal to the axial clearance "j" determined by the yielding member 68. This return movement does not exceed the amplitude of said clearance since the tension of the springs 56 is smaller than the forces of friction.

I claim:

1. A disk brake including a rotor, a stator, a fluid pressure operated cylinder, a piston in said cylinder, a wear pad operatively connected to said piston, a ball and socket means located between said piston and wear pad to form said connection, said ball and socket means being fixedly connected to said wear pad and movably connected to said piston for permitting lateral movement of said wear pad with respect to the axis of said piston.

2. A disk brake comprising a rotatable member, a stationary housing straddling said rotatable member and extending circumferentially over a portion of the surfaces of said rotatable member, a fluid pressure operated cylinder carried by said stationary housing, a piston in said cylinder, said piston having a projection on its operative end, a flat annular washer received on said projection, a ring member adapted to slide on said washer, a spherical recess in said ring member, a wear pad having circular notches at opposite ends thereof, a dome-shaped member connected to said wear pad and received in the spherical recess of said ring member, resilient means to maintain said wear pad and dome-shaped and ring members in assembled relation, and anchor pins carried by said stationary housing and engaging the circular notches of said wear pad.

3. A brake comprising a rotor, a stator, a fluid motor having a piston slidable therein, a wear pad operatively connected to said piston, a ball and socket joint included in said connection, the ball member of said joint having a diameter substantially equal to the piston diameter, and means interposed between said ball and socket joint and the piston, said means being slidably connected to said ball and socket joint and fixedly connected to said piston for permitting lateral movement of said ball and socket joint as a unit with respect to the axis of said piston.

4. In a brake a rotatable member, a stationary housing straddling said member and extending circumferentially over only a portion of the surfaces thereof, a pair of fluid motors one on each side of said rotatable member, a wear pad operatively connected to each of said fluid motors, a ball and socket joint located between said wear pads and fluid motors to form said connection, means operatively connected to said fluid motor on which said ball and socket and wear pad may move as a unit transversely to the axis of said fluid motor, and anchor means for each of said wear pads, said anchor means including pins received in said housing and extending axially towards said rotatable member.

5. In a brake, a rotor, a stator, a stamped dish-shaped plate member forming a part of the stator and located on one side of the rotor, a complementary stamped dish-shaped plate member located on the opposite side of the rotor and secured to the first dish-shaped plate member, a pair of wheel cylinders respectively carried by said dish-shaped plate members, a pair of wear pads located in the recesses formed by said dish-shaped plate members, means providing a spherical surface and extending from the side of each wear pad opposite its rotor-engaging surface, and means biassed by said wheel cylinders and slidably movable transversely to the longitudinal axis of its wheel cylinder and having a surface complementary with the spherical surface of said means secured to the wear pad to effect frictional resistance therebetween opposing angular movement of the wear pad.

6. A disk brake including a rotor, a fluid pressure operated cylinder, a piston in said cylinder, a wear pad adapted to be brought by said piston into engagement with said rotor, thrust means disposed at the outer face of said piston and slidable transversely thereto, means engageable by said thrust means and having a spherical seat therein, and a spherical member carried by said wear pad and projecting from the surface of the wear pad opposite the rotor-engaging surface and complementary with said spherical seat in said thrust means and forming a frictional connection therewith to oppose angular movement of the wear pad thereon, said spherical member having a diameter of substantially the same size as that of the piston.

7. In a brake, a rotatable member, a stationary housing straddling said member and extending circumferentially over only a portion of the surfaces thereof, fluid motors one on each side of said rotatable member, a piston slidable in each of said fluid motors, a thrust member disposed at the outer face of each piston and slidable thereon in a direction transversely to the direction of movement of its piston, a wear pad between each thrust member and the rotor sides straddled by said housing, anchoring means for each wear pad extending from the housing to receive the anchoring thrust of the wear pad which moves in an anchoring direction independently of its actuating piston, and means forming a swivelable connection between each thrust member and wear pad and effecting frictional resistance to free swivelable movement of the wear pad to define the wear pad angular position relatively to the opposed rotatable member.

8. In a brake, a rotatable member, a stationary housing straddling said rotatable member and extending circumferentially over only a portion of the surfaces thereof, fluid motors one on each side of said rotatable member, and carried by said stationary housing, a piston slidable in each of said fluid motors, a wear pad biassed by each of said pistons into engagement with said rotatable member, means mounted for slidable movement transversely between each friction pad and piston in a direction perpendicularly to the direction of movement of said slidable piston and having a thrust connection with its wear pad providing swivelable movement under frictional resistance effecting parallel disposition of the friction pad with the opposed surface of said rotatable member.

9. In a brake, a rotatable member, a stationary housing straddling said member and extending circumferentially over only a portion of the surfaces thereof, fluid motors one on each side of said rotatable member and carried by said stationary housing, a piston slidable in each of said fluid motors, a wear pad disposed between each piston and the two opposite sides of the rotatable member, means forming a thrust connection between the piston and friction member and providing slidable movement of the thrust member and wear pad transverse to the movement of said piston, each thrust connection having a swivelable connection with its friction member whereby the friction member moves through angular positions effecting conformable contact with the opposed surface of said rotatable member.

References Cited in the file of this patent

UNITED STATES PATENTS

| | | |
|---|---|---|
| 1,755,830 | Loughead | Apr. 22, 1930 |
| 2,029,070 | Higbee | Jan. 28, 1936 |
| 2,050,902 | Tatter | Aug. 11, 1936 |
| 2,655,229 | Eksergian | Oct. 13, 1953 |
| 2,746,254 | Lucien | May 22, 1956 |
| 2,754,936 | Butler | July 17, 1956 |

FOREIGN PATENTS

| | | |
|---|---|---|
| 1,120,550 | France | Apr. 23, 1956 |
| 703,213 | Great Britain | Jan. 27, 1954 |
| 717,350 | Great Britain | Oct. 27, 1954 |
| 728,709 | Great Britain | Apr. 27, 1955 |
| 742,338 | Great Britain | Dec. 21, 1955 |